United States Patent [19]

Kerwin

[11] Patent Number: 4,850,109
[45] Date of Patent: Jul. 25, 1989

[54] ADAPTOR TO CONVERT A CHAIN SAW TO A CIRCULAR SAW

[75] Inventor: Michael A. Kerwin, Hancock, N.Y.

[73] Assignee: F. Gerald Mackin, Hancock, N.Y.; a part interest

[21] Appl. No.: 169,934

[22] Filed: Mar. 18, 1988

[51] Int. Cl.⁴ ............................ B27B 5/32; F16B 7/00
[52] U.S. Cl. ....................................... 30/122; 30/388; 83/666; 403/3; 403/259
[58] Field of Search ................. 30/122, 388, 390, 391; 403/3, 259, 261; 83/665, 666

[56] References Cited

U.S. PATENT DOCUMENTS

| | | | |
|---|---|---|---|
| 1,797,296 | 3/1931 | Ray | 403/259 |
| 3,371,691 | 3/1968 | Ehinger | 30/390 |
| 4,121,336 | 10/1978 | Loyd | 30/122 |
| 4,343,214 | 8/1982 | Schädlich | 83/166 X |

Primary Examiner—Frank T. Yost
Assistant Examiner—Michael D. Folkerts

[57] ABSTRACT

An adaptor for converting a chain saw into a circular saw by means of a collar secured to both the clutch housing and the hub of the existing chain saw, the collar being held by a washer and a nut from the chain saw, said collar being cylindrical with a concentric opening through it, the concentric opening having a smaller diameter for a minor portion of the length of the collar and a larger diameter for a major portion of the length of the collar, the portion of the opening with a larger diameter being threaded and portion of the opening having a smaller diameter being ribbed, the adaptor further including a shaft extension plug threaded into the threaded opening of the collar, the shaft extension plug having a face plate and a concentric threaded shaft which extends concentrically from the face plate, for mounting a circular saw blade with a nut being threaded on the concentric shaft to hold the circular saw blade.

10 Claims, 2 Drawing Sheets

ADAPTOR TO CONVERT A CHAIN SAW TO A CIRCULAR SAW

BACKGROUND OF THE INVENTION

Both circular saws and chain saws are well known. Most circular saws are electric-powered and comparatively light in duty while chain saws run a wide-duty range from light-duty, electrically-powered chain saws to heavy-duty gasoline-powered, chain saws. Thus, electrically-powered circular saws are readily available. However heavy-duty, gas-powered circular saws, although some have been commercially available in the past, are not readily available. In various types of work, particularly the cutting of stone in quarries, the use of a portable, gasoline-powered circular saw is required. It is highly advantageous to be able to produce an inexpensive heavy-duty circular saw at a modest cost by converting a gas-powered chain saw already owned by the user.

In accordance with this invention, an adaptor is provided to convert a heavy-duty, gasoline-powered chain saw into a circular saw both quickly and easily by the mere removal of the chain, chain bar and chain sprocket from the chain saw and the addition of a few easily-installed parts to the chain saw to permit the mounting of a circular saw blade.

SUMMARY OF THE INVENTION

In accordance with this invention, an adaptor is mounted on the existing clutch housing and existing hub of a chain saw. The clutch housing and the hub of the chain saw are mounted on the original shaft of the chain saw. A collar, which is cylindrical and has a concentric interior opening, with a smaller diameter at one end and a larger diameter at the other end is mounted on the clutch housing and hub. The smaller diameter opening is mounted about the hub and against the clutch housing. The large diameter opening is threaded internally. A washer is placed against an interior face which results from the juncture of the large diameter opening and the smaller diameter opening. The original nut supplied with the chain saw is affixed to the original chain saw shaft after the collar and washer is placed over the original shaft and the original nut is threaded onto the original shaft of the chain saw. A shaft extension member is threaded into the larger internal opening. The shaft extension member includes a plug member which engages the threaded opening of the collar and an extended shaft with a male thread extending concentrically from a face plate. A circular saw blade is placed on the circular saw shaft and against the face plate and held in place by a circular saw nut which is threaded onto the extended shaft.

DETAILED DESCRIPTION OF THE DRAWINGS

DETAILED DESCRIPTION OF THE INVENTION

When converting a chain saw in use in accordance with this invention, a chain bar (not shown) and a chain (not shown) as well as the chain sprocket (not shown) must be removed. The chain sprocket (not shown) is held in place against a hub 11, which is part of the original chain saw, by a means of nut 13, which is threaded on an original drive shaft 15 of the chain saw. The original nut 13 is reused when the chain saw is modified into a circular saw in accordance with this invention.

The chain saw, as purchased, is equipped with a clutch 17 so that, should the chain (not shown) bind, the engine (not shown) powering the chain saw, can continue to operate without damage to itself, even though the chain is rigidly held absolutely motionless. The hub 11 is rigidly secured to the clutch 17. When the chain saw is modified in accordance with this invention, the clutch 17 as originally provided with the chain saw, is left in place and serves the same purpose in the event the circular saw blade binds.

The original drive shaft 15 of the chain saw extends from the clutch 17. The hub 11 which is also part of the chain saw as manufactured and is rigidly mounted on the clutch 17. The hub 11 is cylindrical, having a diameter of approximately one to two times that of the original drive shaft 15.

Figure 1:
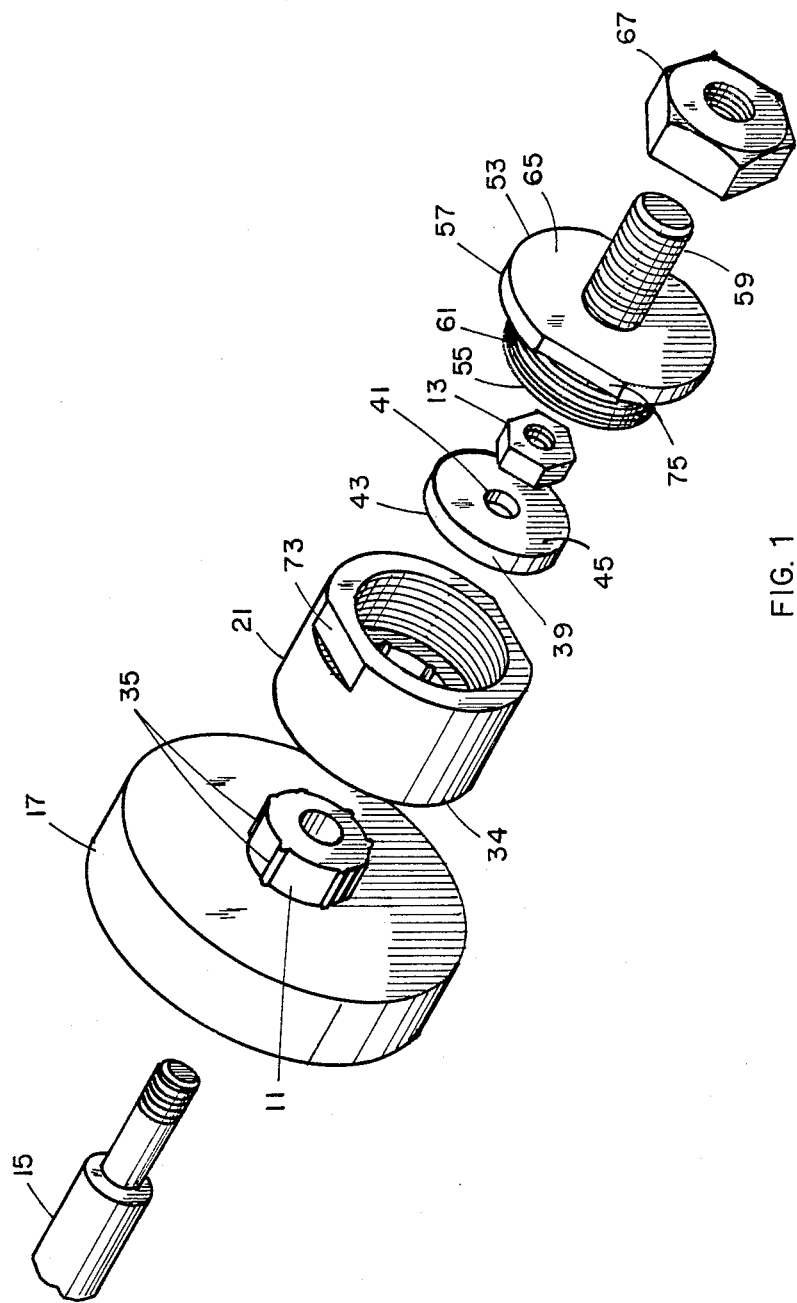
FIG. 1 is an exploded perspective view of the adaptor showing the original shaft of the chain saw and with the circular saw blade shown in silhouette.
Figure 2:
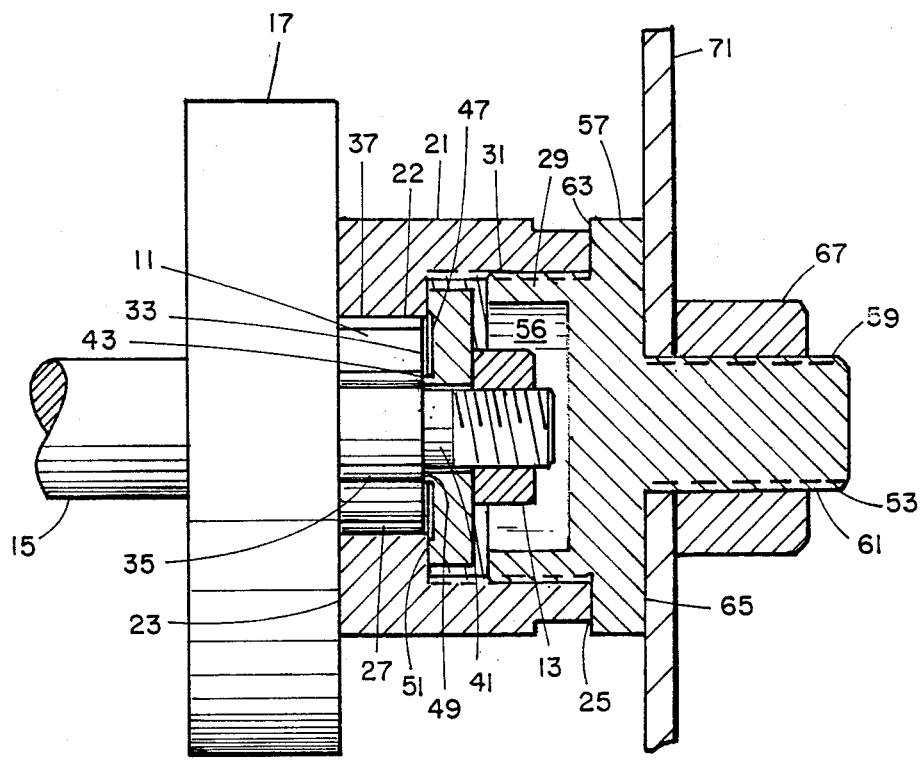
FIG. 2 is a side elevation of the adaptor in cross section along its longitudinal axis and the existing hub and clutch also shown and with the shaft of the chain saw shown taken off.

The adaptor, in accordance with this invention, includes a collar 21 which is also cylindrical with an internal concentric opening 22 extending through it. The collar 21 has an inside end 23 which engages the hub and an outside end 25 remote from the hub 11. The internal concentric opening of the collar 21 has a minor or smaller diameter portion which extends for a minor portion of the length of the collar 21 at the inside end 23, and a major or larger diameter which extends for a major portion of the collar at the opposite end which is an outside end 25. The inside end 23 and the outside end 25 are both flat surfaces parallel to one another and at right angles to the major axis of the collar 21. The minor portion 27 extends for approximately one-third the length of the collar 21 and the major portion 29 extends for approximately the other two-thirds of the length of the collar 21 as can be best seen in FIG. 2. The major portion 29 has an internal thread 31 extending to the outside end 25 of the collar 21. The length of the minor portion 27 of the collar is just slightly more than the thickness of the hub 11 so as to assure that the inside end of the collar is pressed against the clutch. The major diameter of the major portion 29 and the minor diameter of the minor portion 27 are both constant. An internal face 33 which is parallel with the two outside ends 25 is located at the point where the major portion 29 end and the minor portion 27 meet. The internal face 33 results from the difference in diameter of the major portion 29 and the minor portion 27. The length of the collar 21 is slightly longer than the length of the original drive shaft 15, including the hub 11, which is from the clutch to the end of the original drive shaft 15. The collar has an outside diameter 34 which is constant.

Even though the original drive shaft 15 of the chain saw extends a distance less than the overall length of the collar 21, the original drive shaft 15 has a length greater than the length of the minor portion 27 of the collar 21. The minor portion 27 of the collar 21 is placed over the hub 11 of the chain saw and the minor diameter of the minor portion 27 of the collar 21 is sized to fit over the hub 11. The hub 11 of the chain saw usually has ribs 35 equally spaced about the circumference of the hub 11. The ribs 35 are aligned with the axis of the original drive shaft 15 the minor portion 27 of the collar 21 has interior grooves 37 adapted to receive the ribs 35 of the hub 11.

By entering the outside end 25 of the collar 21, a washer 39 is placed over the original drive shaft 15 and is held against the internal face 33 by threading the original nut back on the original drive shaft 15.

The washer 39 having a concentric center opening 41 is designed specifically to hold the inside end 23 of the collar 21 against the clutch 17, and has a diameter greater that the minor diameter of the minor portion 27 of the collar 21 but smaller than the diameter of the major portion 29 of the collar 21. The washer 39 also has an inside surface 43 which is placed toward the hub and an opposite side or outside surface 45 which faces away from the hub 11. To assure that the washer 39 presses against the internal face 33, the inside surface 43 of the washer 39 has a concentric annular groove 47 of rectangular crosssection and of substantially equal depth extending from near the outer edge to near the concentric center opening 41. As a result, an inner circular lip 49 and an outer circular lip 51 are formed. The outer circular lip 51 presses against the internal face 33 of the collar 21 and the inner circular lip 49 presses against the hub 11, thus assuring that the collar 21 is held securely in place.

The shaft extension member 53 includes a plug member 55, a face plate 57 and an extended shaft 59. The plug member 55 has a male or outer thread 61 adapted to engage the internal thread 31 of the major portion 29 of the collar 21. The plug member has a hollow exterior 56. A right-handed thread is preferred between the plug member 55 and the major portion 29 of the collar 21.

The face plate 57 is a circular disc with two sides, namely an interior side 63 and an exterior side 65. The interior side 63 of the face plate 57 and the plug member 55 are concentrically mounted on one another. The diameter of the face plate 57 is substantially the same as the diameter of the collar 21. The extended shaft 59 extends from the center of the exterior side 65 of the face plate 57 which is the opposite side of the face plate 57 from the plug member 55. The extended shaft 59 has an external or male thread 67. The extended shaft and the original shaft 59 and the plug member 55 have a common longitudinal axis.

The circular saw blade is mounted on the extended shaft 59. An extra nut 69 is threaded onto the external thread 67 of the extended shaft 59 to hold a circular saw blade 71 against the face plate 57. The extended shaft 59 and extra nut 67 are also preferably right-handed.

Flats 73 are located on the collar 21 and flats 75 are located in the face plate 57 to permit the use of open-end wrenches.

While a preferred embodiment has been shown and described, various modifications and substitutions may be made without departing from the spirit and scope of this invention. Accordingly, it is understood that this invention has been described by way of illustration rather than limitation.

I claim:

1. An adaptor for converting a chain saw to a circular saw with a circular saw blade, said chain saw having a clutch with an original drive shaft with an original nut mounted thereon, said original drive shaft extending from the clutch and having a hub rigidly mounted on said clutch, said adaptor comprising:

a collar having a cylindrical shape and adapted for mounting on said hub and having an inner end and an outer end and a concentric opening extending from the inner end to the outer end, the opening at the inner end being a minor opening and the opening at the outside end being a major opening, the minor opening extending a minor portion of the length of the cylindrical member and having a smaller diameter than the opening in the major portion which extends a major portion of the length of the cylindrical member, the major portion and the minor portion being contiguous to one another and forming an interior face which is parallel to the outside end and the inside end, the major opening having an interior thread extending from the outside end to the interior face, the minor opening being adapted to engage the hub of the chain saw;

a washer with a concentric central opening therein and having an outside diameter greater than the diameter of the opening in the minor portion of the cylindrical member and smaller than the diameter of the opening in the major portion of the cylindrical member, said washer having an inside surface and an outside surface, said washer being mounted on the drive shaft and against the hub and the interior face of the collar; said original nut engaging the washer and forcing the washer firmly against the interior surface of the collar;

a shaft extension member including a plug member having a cylindrical portion with an exterior thread adapted to engage the interior thread of the opening in the major portion of the collar and a face plate which is circular and which is concentrically secured to the plug member, said shaft extension member further including an extended shaft mounted concentrically on the opposite side of said face plate from said plug member said extended shaft being threaded; and an extra nut for threadably engaging said extended shaft for holding the circular saw blade against the face plate.

2. An adaptor, according to claim 1, wherein the length of the minor portion of the collar is approximately one-third of the length of the collar.

3. An adaptor for converting a chain saw to a circular saw with a circular saw blade, said chain saw having a clutch with an original drive shaft with an original nut mounted thereon, said original drive shaft extending from the clutch and having a hub mounted on said original drive shaft adjacent said clutch, said adaptor comprising:

a collar having a cylindrical shape and adapted for mounting on said hub and having an inner end and an outer end and a concentric opening extending from the inner end to the outer end, the opening at the inner end being a minor opening and the opening at the outside end being a major opening, the minor opening extending a minor portion of the length of the collar and having a smaller diameter than the opening in the major portion which extends a major portion of the length of the collar;

a washer with a concentric central opening therein and having an outside diameter greater than the diameter of the opening in the minor portion of the cylindrical member and smaller than the diameter of the opening in the major portion of the collar said washer being mounted on the drive shaft and against the hub and the interior surface of the collar, said original nut engaging the washer and forcing the washer firmly against the interior surface of the collar;

a shaft extension member including a plug member having a cylindrical portion adapted to engage the opening in the major portion of the collar and a face plate which is circular and which is concentrically secured to the plug member, said shaft extension member further including an extended shaft mounted concentrically on the opposite side of said face plate from said plug member said extended shaft being threaded; and an extra nut for threadably engaging said extended shaft and holng the circular saw blade against the face plate.

4. An adaptor according to claim 3 wherein the major portion and the minor portion of the collar are contiguous to one another and forming an interior face which is parallel to the outside end and the inside end of the collar.

5. An adaptor according to claim 3 wherein the washer has an inside surface and an outside surface and has an annular groove with a rectangular cross section on the inside surface.

6. An adaptor for converting a chain saw to a circular saw with a circular saw blade, said chain saw having a clutch with an original drive shaft with an original nut mounted thereon, said original shaft extending from the clutch and having a hub mounted on said original drive shaft adjacent to said clutch, said hub having a ribbed circumference, said adaptor comprising:

a collar having a cylindrical shape and adapted for mounting on said hub and having an inner end and an outer end and a concentric opening extending from the inner end to the outer end, the opening at the inner end being a minor opening and the opening at the outside end being a major opening, the minor opening extending a minor portion of the length of the cylindrical member and having a smaller diameter than the opening in the major portion which extends a major portion of the length of the cylindrical member, the major portion and the minor portion being contiguous to one another and forming an interior face which is parallel to the outside end and the inside end, the major opening having an interior thread extending from the outside end, to the interior face, the minor opening having grooves extending longitudinally from the inner end to the interior face and being adapted to engage the ribbed circumference of the hub of the chain saw;

a washer with a concentric central opening therein and having an outside diameter greater than the diameter of the opening in the minor portion of the cylindrical member and smaller than the diameter of the opening in the major portion of the cylindrical member, said washer having an inside surface and an outside surface and having an annular groove with a rectangular cross-section in the inside surface, said washer being mounted on the drive shaft and against the hub and the interior surface of the cylindrical member, said original nut engaging the washer and forcing the washer firmly against the interior surface of the collar;

a shaft extension member including a plug member having a cylindrical portion adapted to engage the opening in the major portion of the collar and a face plate which is circular and which is concentrically secured to the plug member, said shaft extension member further including an extended shaft mounted concentrically on the opposite side of said face plate from said plug member said extended shaft being threaded; and an extra nut for threadably engaging said extended shaft and holding the circular saw blade against the face plate.

7. An adaptor, according to claim 6, wherein the length of the minor portion of the collar is approximately one-third the length of the collar.

8. An adaptor according to claim 6 wherein the face plate has a diameter substantially equal to the outer diameter of the collar.

9. An adaptor according to claim 6 wherein;
the length of the minor portion of the collar is approximately one-third the length of the collar; and
the face plate has a diameter substantially equal to the outer diameter of the collar.

10. An adaptor according to claim 6 wherein the plug member has a hollow interior.

* * * * *